United States Patent Office  3,067,220  Patented Dec. 4, 1962

3,067,220
HYDROXYALKYLESTER SULFONATES
Cornelis Borstlap and Pieter L. Kooijman, Amsterdam, Netherlands, assignors to Shell Oil Company, New York, N.Y., a corporation of Delaware
No Drawing. Filed Dec. 14, 1961, Ser. No. 159,446
Claims priority, application Netherlands June 22, 1961
19 Claims. (Cl. 260—400)

This invention relates to surface active compounds and compositions and to their production. The invention relates more particularly to the production of novel sulfonates of hydroxyalkyl esters of tertiary alkanoic acids and novel surface active compositions comprising sulfonates of hydroxyalkyl esters of tertiary alkanoic acids.

It is known to produce certain surface active compounds by the reaction of a salt of a fatty acid with a halogen-substituted alkyl sulfonate. These products, as obtained heretofore by such procedure, vary considerably in characteristics desired in surface active compositions intended for practical utility. Often they are lacking in a satisfactory degree of stability, particularly with respect to resistance to hydrolysis, and in wetting capacity, foaming power, and the like.

It is, therefore, an object of the present invention to provide an improved process for the production of novel compounds and compositions comprising tertiary alkanoic acid esters of hydroxy-alkyl sulfonic acids and salts thereof.

A specific object of the invention is the provision of an improved process for the production of surface active compositions comprising novel hydroxypropyl ester sulfonates derived from tertiary alkanoic acids. Other objects and advantages of the present invention will become apparent from the following detailed description thereof.

A method enabling the production of novel surface active compounds and compositions by reacting a salt of an alkane carboxylic acid having a quaternary carbon atom in alpha position with respect to the carbon atom in the carboxyl group with a salt of a halogen-substituted aliphatic sulfonic acid is disclosed and claimed in copending U.S. application (P-4032-Netherlands application 259,619).

It has now been found that novel surface active compounds and compositions consisting essentially of hydroxy-substituted alkyl ester sulfonates are produced by the reaction of an epoxyalkyl ester of an alkane carboxylic acid having a quaternary carbon atom in alpha position with respect to the carboxyl carbon atom with a bisulfite.

The alkane tertiary-monocarboxylic acid esters of epoxy-alkanols employed as a starting material in the process of the invention comprise broadly those represented by the general formula:

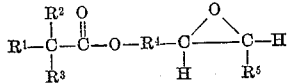

I wherein:
$R^1$, $R^2$ and $R^3$ are alkyl;
The sum total of the carbon atoms in $R^1+R^2+R^3$ has a value of from 3 to about 19;
$R^4$ represents an alkylene group of 1 to about 8 carbons;
$R^5$ is hydrogen or alkyl; and
The sum total of the carbon atoms in $R^4+R^5$ has a value from 1 to about 20.

In the foregoing Formula I $R^1$, $R^2$ and $R^3$, and also $R^5$ when alkyl, may each represent an alkyl such as, for example, methyl, ethyl, propyl, butyl, pentyl, hexyl, heptyl, decyl, etc.; they may be of branched or straight chain structure. The alkylene radical $R^4$ may be of straight chain or branched structure. The suitable esters may be further substituted by functional groups which do not enter into or interfere with, the desired reaction under the conditions employed. It is seen that the suitable epoxy-esters contain at least five carbons in the acid portion of the molecule. They may be referred to as trialkyl acetic acid esters of epoxy-substituted alkanols, such as, for example, the trimethyl acetic acid ester, the dimethyl ethyl acetic acid ester, the tributyl acetic acid ester, the propyl diamyl acetic acid ester, the triamyl acetic acid ester, the dihexyl heptyl acetic acid ester, etc., of epoxy-ester, substituted alkanols. Of the defined esters the 1,2-epoxy-substituted esters, that is those having the epoxy-oxygen attached to vicinal carbon atoms of the epoxy-substituted alkyl group of the ester, are preferred. Examples of the suitable tertiary monocarboxylic acid esters of epoxy-substituted hydroxyalkanes defined by foregoing Formula I are:

TABLE A

Ref. No.:
(1) Trimethyl acetic acid ester of 3-hydroxy-1,2-epoxypropane.
(2) 2,2-dipropylpentanoic acid ester of 4-hydroxy-1,2-epoxybutane.
(3) 2,2-dimethylbutanoic acid ester of 3-hydroxy-1,3-dimethyl-1,2-epoxypropane.
(4) 2-ethyl-2-methylheptanoic acid ester of 3-hydroxy-1,2-epoxybutane.
(5) 2,2,4,4-tetramethylpentanoic acid ester of 6-hydroxy-2-ethyl-2,3-epoxyhexane.
(6) 2-ethyl-2-methylpentanoic acid ester of 4-hydroxy-3-ethyl-1,2-epoxybutane.
(7) 2-cyclohexyl-2-methylpropionic acid ester of 4-hydroxy-1,2-epoxybutane.
(8) Tributyl acetic acid ester of 3-hydroxy-1,2-epoxypropane.
(9) Trimethyl acetic acid ester of 10-hydroxy-1,2-epoxydecane.
(10) Dimethyl ethyl acetic acid ester of 7-hydroxy-6-methyl-1,2-epoxyheptane.

Preferred among the suitable epoxy esters employed as starting materials for the process of the invention are the tertiary alkanoic acid esters of 1,2-epoxy-3-hydroxypropane and alkyl-substituted 1,2-epoxy-3-hydroxypropane (that is, the glycidyl esters and alkyl-substituted glycidyl esters of the trialkyl acetic acids) such as, for example:

Trimethyl acetic acid ester of 3-hydroxy-1,2-epoxypropane (glycidyl pivalate),
Dimethyl ethyl acetic acid ester of 3-hydroxy-1-methyl-1,2-epoxypropane,
Triethyl acetic acid ester of 3-hydroxy-1,2-epoxypropane.

Of these the tertiary alkanoic acid esters of 1,2-epoxy-3-hydroxypropane, that is those of the foregoing Formula I wherein $R^4$ is methylene and $R^5$ is hydrogen are particularly preferred. The epoxy esters of this preferred group wherein to total number of carbon atoms in $R^1+R^2+R^3$ is at least 8 are particularly desirable as starting material because of the valuable surface active compounds and compositions derived therefrom in the process of the invention.

The suitable tertiary monocarboxylic acid esters of epoxy-alkanols defined by Formula I, used as starting materials in the process of the invention may be obtained from any suitable source. They may suitably be produced by interaction of a tertiary alkanoic acid with a suitable epoxy compound under conditions resulting in the production of the desired tertiary alkanoic acid ester of an epoxy alkanol of Formula I. Suitable epoxy alkyl esters of tertiary monocarboxylic acids may be obtained, for example, by reacting a salt, for example, an alkali metal salt of a tertiary monocarboxylic acid with a halogen-substituted epoxy alkane such as, a chloro-epoxy-alkane. Thus, the glycidyl esters of tertiary monocarboxylic acids are produced by gradual addition of the sodium salt of the tertiary monocarboxylic acid, preferably in the form of a concentrated aqueous solution, or else dissolved in a ketone, to boiling epichlorohydrin.

Essential to the attainment of the objects of the invention is the use of starting material of an epoxy-alkyl ester of an alkane carboxylic acid having a quaternary carbon atom in alpha position to the carboxyl group, that is containing a quaternary carbon atom directly linked by carbon to carbon bond to the carbon atom of the carboxyl group. Acids of this class, referred to herein as tertiary carboxylic acids, and used in the preparation of the suitable epoxy ester starting materials, comprise those represented by the general formula:

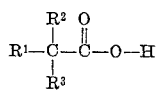

wherein $R^1$, $R^2$ and $R^3$ have the meaning indicated herein above in the definition of the Formula I.

The suitable monocarboxylic acids whose carboxyl group is linked to a quaternary carbon atom may be obtained from any suitable source. Excellent results are obtained, however, with tertiary monocarboxylic acids prepared by reacting aliphatic hydrocarbons with formic acid or with carbon monoxide and water. In this reaction the aliphatic hydrocarbons that are of primary interest are olefins. The reaction is executed in liquid phase at a temperature in the range of from about −25 to about 100° C. and at relatively low pressures, for example, in the range of from about 20 to about 150 atmospheres. Suitable methods for preparing the tertiary monocarboxylic acids are disclosed in U.S. Patent 2,876,241 and in copending applications Serial Nos. 858,609; 858,796; and 858,797, filed December 10, 1959. Suitable olefinic charge materials thus reacted with carbon monoxide and water to produce tertiary monocarboxylic acids comprise commercially available unsaturated hydrocarbons predominating in monoolefins such as, for example, branched or unbranched pentenes, hexenes, heptenes, octenes, nonenes, decenes and high alkenes; polymers and copolymers of such alkenes, such as diisobutylene, propylene-dimer, -trimer and -tetramer, isobutylene trimer; cyclic alkenes, such as cyclopentene and cyclohexene; etc. Commercially available mixtures comprising these alkenes are also used, for example, olefin-containing hydrocarbon fractions such as obtained by thermal vapor phase cracking of paraffin wax in the presence of steam. Olefin-rich products obtained in the Fischer-Tropsch synthesis carried out under moderate pressure also constitute examples of a suitable source of the alpha-branched monocarboxylic acids. Monoolefins preferably employed in the production of the carboxylic acids comprise those having from about six to about twenty carbon atoms to the molecule.

Another method of producing suitable tertiary monocarboxylic acids comprises that relying upon the reaction of saturated hydrocarbons with carbon monoxide and water in the presence of a hydrogen acceptor as described and claimed in copending application Serial No. 141,287, filed September 28, 1961.

Other methods enabling the production of the alkanoic acids consisting of tertiary alkanoic acids from which the suitable epoxy esters of foregoing Formula I are derived comprise those disclosed and claimed in U.S. Patents 2,913,489; 2,913,491; and in copending U.S. application Serial No. 761,376, filed September 16, 1958. Still another method comprises the reaction of olefins with metal carbonyls, for example, nickel carbonyl, known as the "Reppe" method. It is to be understood that the invention is not limited with respect to the source of the tertiary alkanoic acids useful in the production of the epoxy ester starting materials of the process of the present invention.

Suitable methods for the production of tertiary alkanoic acid esters of epoxy alkanols, used as starting materials in the process of the present invention, comprise those disclosed and claimed in copending U.S. application Serial No. 28,865, filed May 13, 1960.

The component of the charge to the process of the invention consisting of tertiary monocarboxylic acid esters of epoxy alkanols, may consist of a single such epoxy ester or a mixture of two or more such esters. Excellent results in the production of surface active compositions are obtained when employing as the epoxy ester reactant a mixture of epoxy esters of the above defined structure derived from tertiary alkanoic acids having from 8 to about 22 carbon atoms, and preferably from about 15 to about 16, or from about 17 to about 18 carbon atoms to the molecule. Such preferred admixtures of the epoxy esters include, for example, the glycidyl esters, the epoxybutyl esters, the epoxy-hexyl ester, the epoxy-octyl esters, the 2,3-epoxy-4-phenyl octyl esters, and the like of mixtures of the tertiary alkanoic acids of 8 to 22 carbon atoms.

In accordance with the invention the above-defined tertiary monocarboxylic acid esters of epoxy-alkanols are reacted with a bisulfite. Suitable bisulfites comprise the alkali metal and alkaline earth metal bisulfites, such as, for example, the Na, K, Mg, Ca, Li, etc., bisulfites. Preferred are the bisulfites possessing appreciable solubility in water or aqueous media under the conditions employed, such as the alkali metal bisulfites, for example, $NaHSO_3$; $KHSO_3$; $LiHSO_3$, etc. Instead of the bisulfite a meta-bisulfite, such as, an alkali metal metabisulfite, for example, $Na_2S_2O_5$, may be employed in the presence of a solvent such as water, or a suitable aqueous media, wherein the metabisulfite converts to the bisulfite.

Reaction of the tertiary alkanoic acid esters of epoxy alkanols with the bisulfite reactant is effected at a temperature of, for example, from about 40° to about 200° C., and preferably from about 65 to about 125° C. Somewhat higher or lower reaction temperatures may, however, be used within the scope of the invention. The temperature preferably employed will depend to some extent upon the specific reactants used. A suitable method comprises the interaction of the reactants under refluxing conditions.

The reaction of the epoxy-alkyl ester with the bisulfite is preferably carried out in the presence of a suitable solvent. Suitable solvents comprise, for example, water, aqueous organic mixtures, such as, aqueous aliphatic alcohols, ketones and the like. Suitable solvents include admixtures of water and an aliphatic acetal preferably an alkanol, such as methanol, ethanol, propanol, butanols, pentanols, etc. The solvent preferably employed will depend to some extent upon the reactants present. Preferred solvents comprise aqueous alkanols of 1 to 3 carbons. The suitable aqueous alcohols, for example, aqueous methanol, may contain water and the alcohol in a weight ratio of water: alcohol of from about 0.25:1 to about 10:1 and preferably from about 1:1 to about 3:1.

The epoxy-ester and bisulfite reactants are preferably charged in substantially equimolar ratios or with the use of the bisulfite in slight excess.

The reactants are preferably agitated, for example, by stirring or by other suitable conventional means, during the course of the reaction. The time of reaction will vary in accordance with the specific reactants and conditions used. In general reaction times of 0.5 to about 10 hours are used.

Under the above-defined conditions the alkane tertiary monocarboxylic acid esters of epoxy-hydroxyalkanols, represented by foregoing Formula I, react with the bisulfite reactant to from corresponding alkali metal sulfonates or alkaline earth metal sulfonates, of tertiary monocarboxylic acid esters of hydroxy alkanols. The products of the process of the invention are represented by the following general Formulae II and III. In the reaction the epoxy-oxygen bond is broken with the formation of a product wherein, of the two carbons originally directly attached to a same oxygen atom, one now is attached to a hydroxyl group and the other to a sulfonate (—SO$_3$Me) group. Two isomeric compounds are therefore generally obtained as represented by Formulae II and III.

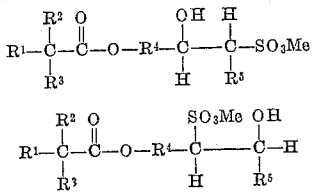

wherein R$^1$, R$^2$, R$^3$, R$^4$, R$^5$ have the meaning indicated therefor above in the definition of the Formula I; and Me is an alkali metal or an alkaline metal or an alkaline earth metal.

Comprised within the broad scope of the invention are compounds represented by foregoing Formulae II and III wherein Me designates broadly a cation imparting water solubility to the product. Me in Formulae II and III may be H or NH$_4^+$. Thus, the ester alkali metal sulfonates represented by Formulae II and III may readily be converted to the corresponding sulfonic acid by reaction with a mineral acid. The sulfonic acid so obtained, in turn is easily converted to the ammonium salt by neutralization with ammonium hydroxide, etc.

The following examples are illustrative of the hydroxy sulfonate esters, and salts thereof, produced in accordance with the invention.

*Example I*

Trimethyl acetic acid (pivalic acid) is produced by reacting tert-butyl alcohol in n-heptane solution with carbon monoxide in the presence of concentrated sulfuric acid at 20° C. and 500 p.s.i.g., and reacting the resulting reaction mixture with water. Trimethyl acetic acid is recovered from the resulting reaction mixture by distillation. The trimethyl acetic acid is converted to the sodium salt by neutralization with NaOH in alcoholic solution. Glycidyl pivalate (trimethyl acetic acid ester of 3-hydroxy-1,2-epoxypropane) is prepared by slowly adding 2 moles of the sodium salt of trimethyl acetic acid in aqueous solution to 18 moles of epichlorohydrin at boiling temperature. Upon completion of the reaction unconverted epichlorohydrin is distilled off leaving a reaction product consisting essentially of glycidyl pivalate. The glycidyl pivalate is added to a mixture of sodium bisulfite, water and methanol. The glycidyl pivalate and bisulfite are used in substantially equimolar amounts. The glycidyl ester and methanol are present in amounts equal to about ¾ and 2 parts by weight respectively, per 1 part of water. The mixture is heated under reflux. Upon completion of the reaction, water is added. The unconverted glycidyl pivalate is then removed by extraction with ether and residual solvents distilled off. The residue is taken up in isopropyl alcohol and inorganic salt, mostly unconverted bisulfite, is removed by filtration. The alcohol solvent is then distilled off. The remaining reaction product is found to consist essentially of trimethyl acetic acid ester of dihydroxypropane sodium sulfonate. The sulfonate product consists predominantly of the trimethyl acetic acid ester of 2,3-dihydroxypropane sodium sulfonate

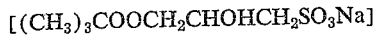

in admixture with a minor amount of the trimethyl acetic acid ester of 1,3-dihydroxypropane sodium sulfonate

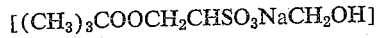

*Example II*

Each compound in following Table B, identified therein by a reference number, is obtained by reacting the tertiary carboxylic acid ester of epoxy-alkanol listed in foregoing Table A, identified therein by the same reference number as the derivative product of Table B, with sodium bisulfit. The reaction is carried out by heating the epoxy-ester reactant with the sodium bisulfite in substantially equimolar proportions under reflux conditions, while stirring, in the presence of aqueous methanol. The aqueous methanol used consists of 1 part water for 2 parts methanol by weight. The aqueous methanol is used in an amount equal to about five times that of the epoxy-ester reactant. Upon completion of the reaction the mixture is diluted with water and extracted with ether. After distilling off residual solvent the product is taken up in propyl alcohol and residual inorganic salt, consisting largely of unconverted sodium bisulfite, removed by filtration. The alcohol is distilled off leaving the desired ester sulfonate.

TABLE B

Ref. No.:
(1) Trimethyl acetic acid ester of 2,3-dihydroxypropane sodium sulfonate.
(1') Trimethyl acetic acid ester of 1,3-dihydroxypropane sodium sulfonate.
(2) 2,2-dipropylpentanoic acid ester of 2,4-dihydroxybutane-1-sodium sulfonate.
(2') 2,2-dipropylpentanoic acid ester of 1,4-dihydroxybutane-2-sodium sulfonate.
(3) 2,2-dimethylbutanoic acid ester of 2,3-dihydroxy-1,3-dimethylpropane sodium sulfonate.
(3') 2,2-dimethylbutanoic acid ester of 1,3-dihydroxy-1,3-dimethylpropane sodium sulfonate.
(4) 2-ethyl-2-methylheptanoic acid ester of 2,3-dihydroxybutane-1-sodium sulfonate.
(4') 2-ethyl-2-methylheptanoic acid ester of 1,3-dihydroxybutane-2-sodium sulfonate.
(5) 2,2,4,4-tetramethylpentanoic acid ester of 3,6-dihydroxy-2-ethyl-2-sodium sulfonate.
(5') 2,2,4,4-tetramethylpentanoic acid ester of 2,6-dihydroxy-2-ethyl-3-sodium sulfonate.
(6) 2-ethyl-2-methylpentanoic acid ester of 2,4-dihydroxy-3-ethylbutane-1-sodium sulfonate.
(6') 2-ethyl-2-methylpentanoic acid ester of 1,4-dihydroxy-3-ethylbutane-2-sodium sulfonate.
(7) 2-cyclohexyl-2-methylpropionic acid ester of 2,4-dihydroxybutane-1-sodium sulfonate.
(7') 2-cyclohexyl-2-methylpropionic acid ester of 1,4-dihydroxybutane-2-sodium sulfonate.
(8) Tributyl acetic acid ester of 2,3-dihydroxypropane sodium sulfonate.
(8') Tributyl acetic acid ester of 1,3-dihydroxypropane sodium sulfonate.
(9) Trimethyl acetic acid ester of 2,10-dihydroxydecane-1-sodium sulfonate.
(9') Trimethyl acetic acid ester of 1,10-dihydroxydecane-2-sodium sulfonate.
(10) Dimethyl ethyl acetic acid ester of 2,7-dihydroxy-6-methylheptane-1-sodium sulfonate.
(10') Dimethyl ethyl acetic acid ester of 1,7-dihydroxy-6-methylheptane-2-sodium sulfonate.

Similarly prepared are the potassium-, lithium-, magnesium-, sulfonates corresponding to the compounds of Table B by substituting the appropriate alkali metal bisulfite in the described reactions of Example II.

The hydroxy ester sulfonate products of the invention are further exemplified by the following, which are obtained as indicated herein above by reacting the appropriate tertiary monocarboxylic acid esters of epoxy alkanol with the appropriate alkali metal, or alkaline earth metal, bisulfite.

The alkaline earth metal salts and alkali metal salts, such as, for example, the sodium, potassium, calcium, lithium or magnesium salts of:

Trimethyl acetic acid ester of 2,3-dihydroxypropane sulfonic acid.
Trimethyl acetic acid ester of 2,4-dihydroxybutane-1-sulfonic acid.
Diethyl acetic acid ester of 2,3-dihydroxy-1,3-dimethylpropane sulfonic acid.
Tributyl acetic acid ester of 2,3-dihydroxypropane sulfonic acid.
2-ethyl-2-n-butyl decanoic acid ester of 2,3-dihydroxypropane sulfonic acid.

The hydroxy-substituted sulfonate esters produced in the process of the present invention define a special class having a quaternary carbon atom in the alpha position with respect to the acyl group. It is the presence of the alpha-position quaternary carbon atom to which are attributed, at least in part, advantageous characteristics peculiar to the hydroxy-substituted sulfonate esters, obtained in the process of the invention. Preferred hydroxy-substituted sulfonate esters of tertiary alkane monocarboxylic acids obtained in accordance with the invention comprise the sulfonates of the tertiary alkanoic acid esters of dihydroxypropane and the corresponding sulfonic acids represented by the formulae:

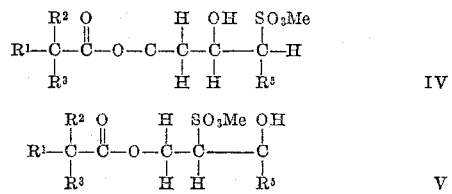

wherein $R^1$, $R^2$, $R^3$, $R^5$ and Me have the meaning as indicated herein above in the definition of compounds of Formulae I, II, and III.

Compositions particularly valuable because of their characteristics and utility in the production of detergents comprise the mixtures of hydroxy-sulfonate esters of the present invention derived from chosen specific admixtures of the above-defined tertiary alkane monocarboxylic acids. Particularly preferred are mixtures of hydroxy-substituted sulfonate esters, including the hydroxy propane sulfonate esters and alkyl-substituted derivatives thereof, derived from admixed tertiary alkane monocarboxylic acids having from about 8 to about 22 carbon atoms to the molecule. Charactertistics of the composition within this defined class may be controlled to obtain specifically desired modifications by controlling the specific molecular range of the admixture of tertiary carboxylic acid from which the epoxy ester starting materials are derived. Thus, compositions possessing particularly desired characteristics with respect to surface activity in various forms of modifications comprise hydroxy-substituted sulfonate ester compositions of the present invention such as the following: an admixture of the sodium salts of tertiary alkane monocarboxylic acid esters of 1,2-dihydroxypropane sulfonic acid derived from admixed tertiary alkane monocarboxylic acids having fifteen to sixteen carbon atoms to the molecule and having a boiling range of from about 320 to about 340° C. and an average molecular weight of about 255; admixture of sodium salts of tertiary alkane monocarboxylic acid esters of 1,2-dihydroxypropane sulfonic acid derived from admixed tertiary alkane monocarboxylic acids having from eighteen to nineteen carbon atoms to the molecule, boiling in the range of from about 350° to about 370° C. and having an average molecular weight of about 393; and the composition consisting essentially of sodium salts of tertiary alkane monocarboxylic acid esters of 1,2-dihydroxypropane sulfonic acid derived from tertiary alkane monocarboxylic acids predominating in acids having about seventeen carbon atoms to the molecule, boiling in the range of from about 335 to about 350° C. and having an average molecular weight of about 275. These compositions are readily obtained with aid of the present invention by reaction of the suitable epoxy-alkyl esters of these tertiary carboylic acid mixtures with the appropriate bisulfite as described herein above.

The hydroxy sulfonate esters produced in accordance with the present invention are of value because of their high wetting capacity and excellent foaming power. Their depressant action towards lime soap is outstanding rendering them admirably suited for use in hard water. Their properties render them eminently suitable for use as components of detergent compositions and as textile assistants that must have good wetting effect as well as cleansing properties. A particularly advantageous characteristic of the products obtained in the process of the invention is their unusually high resistance to hydrolysis.

The products of the process of the invention furthermore are of value as flotation agents, alkylating agents, tanning agents, and as intermediate and starting materials in the production of valuable chemical derivatives therefrom.

The hydroxy-substituted sulfonate esters produced in accordance with the invention may be combined with components enhancing or modifying their properties for use as detergents or cleansing agents. Thus, they may have added thereto such materials as other surface-active compounds, alkali pyrophosphates or polyphosphates, silicates, carbonates, sulphates, borates, sodium carboxymethyl cellulose or other soluble derivatives of cellulose or starch, persulphates, perborates, percarbonates, optical bleaching agents, foaming agents, foam stabilizers, and the like.

The following examples are illustrative of the preparation of ester sulfonate compositions in accordance with the invention.

*Example III*

A mixture of olefins having from 14 to 18 carbon atoms to the molecule, obtained by cracking paraffinic hydrocarbons, is reacted with carbon monoxide and water, in liquid phase, with the aid of a catalyst consisting essentially of a phosphoric acid-boron trifluoride-water complex. From the resulting reaction mixture there is separated by distillation a fraction consisting predominantly of tertiary alkane monocarboxylic acids having from 15 to 19 carbon atoms to the molecule. The mixed tertiary monocarboxylic acids so obtained are converted to their sodium salts by reaction with sodium hydroxide.

The mixture of sodium salts of $C_{15}$–$C_{19}$ tertiary monocarboxylic acids so obtained is freed of residual hydrocarbons by extraction with gasoline. The concentration of the sodium salts in solution was adjusted to 50% by weight by addition of water.

A quantity of the aqueous salt solution containing 2 moles of the admixed sodium salts of $C_{15-19}$ alkanoic tertiary monocarboxylic acids was added gradually to 20 moles of epichlorohydrin over a period of 2½ hours. During this operation the temperature of the mixture was kept between 105° and 110° C. During the reaction, epichlorohydrin distilled off azeotropically with water. The distillate formed an epichlorohydrin phase and a water phase. The epichlorohydrin phase was continuously returned to the reactor. In this way the concentration of water in the reaction mixture was kept constant at 2 percent by weight.

At the end of the 2½ hour period excess epichlorohydrin was distilled off; first at normal pressure until the bottoms temperature reached 160° C.; then at a pressure of 20 mm. Hg at 120° C. The latter temperature and pressure conditions were maintained for one hour. The crude reaction product was cooled to 50° C. and washed three times with 150 ml. of distilled water to remove residual NaCl.

The regaining glycidyl ester of $C_{15-19}$ tertiary alkanoic monocarboxylic acids was distilled in vacuo after initial removal of water.

The mixture of glycidyl esters of $C_{15-19}$ tertiary alkanoic monocarboxylic acids so obtained was added to a mixture of sodium bisulfite, water and methanol. The mol ratio of glycidyl esters to sodium bisulfite in the mixture was 1:1. The mixture contained 2 parts of methanol and ¾ parts of glycidyl esters per 1 part of water (by weight). The mixture was refluxed at 74° C. Thereafter, the resulting mixture was diluted with water. Unconverted glycidyl ester was extracted therefrom with ether. Thereupon residual solvent was distilled off and the residue taken up in isopropyl alcohol. Inorganic salt, mainly sodium bisulfite, was removed by filtration. Isopropyl alcohol was then distilled off leaving as the final product a composition consisting of $C_{15-19}$ tertiary alkanoic monocarboxylic acid esters of dihydroxypropane sodium sulfonate. The $C_{15-19}$ tertiary alkanoic acid ester of dihydroxy propane sodium sulfonate composition (consisting essentially of an admixture of $C_{15-19}$ tertiary alkanoic monocarboxylic acid esters of 2,3-dihydroxypropane sulfonates and of 1,3-dihydroxypropane sulfonates) was obtained with a yield of over 90%.

*Example IV*

The foam rating of the composition consisting of $C_{15-19}$ alkane tertiary monocarboxylic acid ester of dihydroxypropane sodium sulfonate prepared as described in foregoing Example III, identified herein as "composition III," was determined. An aqueous solution containing 0.5 g. per liter of the "composition III" and 0.05% w. $Na_2SO_4$ was made using water with a hardness of 18° (English degrees). The foaming capacity of this solution was compared with that of a standard solution of sodium salts of secondary alkyl ester sulfates with 8 to 18 carbon atoms. The foaming capacity of the standard solution was put at 100. The foam rating of the aqueous solution of "composition III" was found to be 300.

*Example V*

To illustrate the stability, particularly with respect to hydrolysis of compositions of mixed hydroxyalkane sulfonates esters of tert alkane monocarboxylic acids of the type prepared in accordance with the process of the invention, a composition "B" consisting essentially of $C_{17}$-alkane tertiary monocarboxylic acid ester of 2,3-dihydroxypropane-1-sodium sulfonate was tested by heating an aqueous 21% w. solution thereof, to which 1% borax (based on the ester sulfonate) had been added, at 70° C. for 14 days at a pH of 8. The solution of "composition B" is identified herein as solution "A." For comparison, two additional solutions "B" and "C" were subjected to the same test. Solution "B" was prepared by substitutitng the corresponding tertiary monocarboxylic acid ester of 2,3-dihydroxypropane-1-sodium sulfate for the sulfonate ester. Solution "C" was prepared by replacing the ester sulfonate of solution "A" with a $C_{17}$ secondary alkyl sodium sulfate. Results obtained are indicated in the following Table I:

TABLE I

| Duration of heating at 70° C., hours | Active material unchanged, percent | | |
|---|---|---|---|
| | Solution composition "A" | Solution composition "B" | Solution composition "C" |
| 3 | 100 | 100 | 100 |
| 5 | 100 | 100 | 100 |
| 22 | 100 | 100 | 98 |
| 99 | 100 | 100 | 97 |
| 122 | 100 | 100 | 97 |
| 166 | 100 | 98 | 84 |
| 200 | 100 | 91 | 80 |
| 270 | 100 | 43 | 41 |

*Example VI*

A composition consisting essentially of an admixture of $C_{15-16}$ alkane tertiary monocarboxylic acid esters of 2,3-dihydroxypropane sodium sulfonate is prepared as follows. An olefin fraction containing olefins of 14 to 18 carbon atoms obtained by cracking paraffins is reacted with carbon monoxide and water in the presence of a catalyst complex consisting of phosphoric acid, boron trifluoride and water in molar ratio of 1:1:1, to obtain a reaction product consisting of a mixture of alkane tertiary monocarboxylic acids having from 15 to 19 carbon atoms to the molecule. The mixture of tertiary acids is fractionated to obtain a $C_{15-16}$ fraction and a $C_{18-19}$ fraction.

The $C_{15-16}$ fraction of alkane tertiary monocarboxylic acids is neutralized with aqueous sodium hydroxide to convert it to a mixture of sodium salts of alkane tertiary monocarboxylic acids having 15 to 16 carbon atoms. The resulting mixture of sodium salts of $C_{15-16}$ tertiary alkanoic acids is reacted with a substantially equimolar amount of epichlorohydrin and the resulting glycidyl ester mixture reacted with sodium bisulfite under the conditions set fourth in Example III to obtain the composition consisting essentially of tertiary $C_{15-16}$ alkanoic acid esters of hydroxypropane sodium sulfonate.

*Example VII*

A hydroxy sulfonate ester composition consisting essentially of a mixture of $C_{18-19}$ tertiary alkanoic monocarboxylic acid esters of dihydroxypropane sodium sulfonate is prepared under substantially identical conditions as set forth in foregoing Example VI but with the exception that the $C_{18-19}$ tertiary alkanoic acid fraction was substituted for the $C_{15-16}$ alkanoic acid fraction as starting material.

Similarly prepared are the K, Li, Ca and Mg salts of the mixed tertiary alkanoic monocarboxylic acid esters of 2,3-dihydroxypropane sulfonic acids and of the mixed tertiary alkanoic monocarboxylic acid esters of alkyl-substituted dihydroxypropane sulfonic acids.

By the terms tertiary alkanoic carboxylic acid, alkane tertiary carboxylic acid and alkane tertiary monocarboxylic acid, as used herein and in the attached claims, it is intended to mean that the organic acids so referred to contain a quaternary carbon atom directly attached to the carbon atom of the carboxyl group.

We claim as our invention:

1. The process for the production of a surface active compound which comprises reacting a tertiary alkanoic acid ester of a 3-hydroxy-1,2-epoxy lower alkane with a water-soluble bisulfite, at a temperature of from about 40 to about 200° C.

2. The process in accordance with claim 1 wherein said reaction is executed in an aqueous medium.

3. The process for the production of a surface active compound which comprises reacting a tertiary alkanoic acid ester of a hydroxy-1,2-epoxyalkane having from 5 to about 22 carbon atoms in the tertiary alkanoic acid portion of the molecule and from 3 to about 22 carbon atoms in the epoxyalkane portion of the molecule with a bisulfite selected from the group consisting of the alkali metal and alkaline earth metal bisulfites, at a temperature of from about 40 to about 200° C., in an aqueous reaction medium.

4. The process in accordance with claim 3 wherein said reaction is executed in the presence of aqueous aliphatic alcohol.

5. The process in accordance with claim 3 wherein said reaction is executed in the presence of aqueous alkanol having from 1 to about 3 carbon atoms.

6. The process for the production of a surface active compound which comprises reacting a tertiary alkanoic acid ester of a 3-hydroxy 1,2-epoxypropane having from 5 to about 22 carbon atoms in the tertiary alkanoic acid portion of the molecule and from 3 to about 22 carbon atoms in the epoxypropane portion of the molecule, with an alkali metal bisulfite, at a temperature of from about 40 to about 200° C., in the presence of aqueous alkanol.

7. The process in accordance with claim 6 wherein said alkali metal sulfite is sodium bisulfite.

8. The process for the production of a surface active compound which comprises reacting a tertiary alkanoic acid ester of 3-hydroxy-1,2-epoxypropane containing from 8 to about 25 carbon atoms in the molecule with sodium bisulfite, at a temperature of from about 40° to about 200° C., in the presence of aqueous methanol.

9. The process for the production of a surface active compound which comprises reacting a trialkyl acetic acid ester of 3-hydroxy-1,2-epoxypropane having from 8 to 25 carbon atoms in the molecule with sodium bisulfite, at a temperature of from about 40° to about 200° C., in the presence of aqueous methanol.

10. The process for the production of a surface active compound which comprises reacting glycidyl ester of pivalic acid with sodium bisulfite, at a temperature of from about 40° to about 200° C., in the presence of aqueous methanol.

11. The process for the production of a surface active composition which comprises reacting a mixture of tertiary alkanoic acid esters of 3-hydroxy-1,2-epoxyalkanes having from 8 to about 22 carbon atoms in the tertiary alkanoic acid portion of the molecule and from 3 to about 22 carbon atoms in the epoxyalkane portion of the molecule, with a water-soluble sulfite, at a temperature of from about 40° to about 200° C., in the presence of an aqueous reaction medium.

12. The process for the production of a surface active composition which comprises reacting a mixture of tertiary alkanoic acid esters of a 3-hydroxy-1,2-epoxypropane having from 8 to about 22 carbon atoms in the tertiary alkanoic acid portion of the molecule with a water soluble bisulfite, at a temperature of from about 40 to about 200° C., in the presence of an aqueous alkanol.

13. The process in accordance with claim 12 wherein said water-solube bisulfite is an alkali metal bisulfite.

14. The process in accordance with claim 13 wherein said reaction is executed in the presence of an aqueous alkanol having from 1 to 3 carbon atoms.

15. The process in accordance with claim 14 wherein said alkali metal bisulfite is sodium bisulfite and said alkanol is methanol.

16. The process for the production of a surface active composition which comprises reacting a mixture of glycidyl esters of tertiary alkanoic acids having from 5 to about 22 carbon atoms to molecule with sodium bisulfite, in the presence of aqueous methanol, at a temperature of from about 40° to about 200° C.

17. The process for the production of a surface active composition which comprises reacting a mixture of glycidyl esters of tertiary alkanoic acids having from about 18 to about 19 carbon atoms to the molecule with sodium bisulfiite, in the presence of aqueous methanol, at a temperature of from about 40° to about 200° C.

18. The process for the production of a surface active composition which comprises reacting a mixture consisting essentially of glycidyl esters of tertiary alkanoic acids having from about 15 to about 16 carbon atoms to the molecule with sodium bisulfite, in the presence of aqueous methanol, at a temperature of from about 40° to about 200° C.

19. The process for the production of a surface active composition which comprises reacting a mixture consisting essentially of glycidyl esters of tertiary alkanoic acids having about 17 carbon atoms to the molecule with sodium bisulfite, at a temperature of from about 40° to about 200° C., in the presence of aqueous methanol.

No reference cited.